(12) United States Patent
Lee et al.

(10) Patent No.: US 10,230,500 B2
(45) Date of Patent: Mar. 12, 2019

(54) METHOD FOR OPERATING BUFFER FOR D2D COMMUNICATION AND WAN COMMUNICATION IN WIRELESS COMMUNICATION SYSTEM AND APPARATUS THEREFOR

(71) Applicant: LG ELECTRONICS INC., Seoul (KR)

(72) Inventors: Seungmin Lee, Seoul (KR); Suckchel Yang, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 4 days.

(21) Appl. No.: 15/508,891

(22) PCT Filed: Sep. 4, 2015

(86) PCT No.: PCT/KR2015/009358
§ 371 (c)(1),
(2) Date: Mar. 3, 2017

(87) PCT Pub. No.: WO2016/036196
PCT Pub. Date: Mar. 10, 2016

(65) Prior Publication Data
US 2017/0207885 A1 Jul. 20, 2017

Related U.S. Application Data

(60) Provisional application No. 62/082,599, filed on Nov. 20, 2014, provisional application No. 62/046,144, filed on Sep. 4, 2014.

(51) Int. Cl.
*H04L 1/18* (2006.01)
*H04L 5/00* (2006.01)
(Continued)

(52) U.S. Cl.
CPC .......... *H04L 1/1835* (2013.01); *H04L 1/1822* (2013.01); *H04L 5/00* (2013.01); *H04W 28/14* (2013.01); *H04W 72/1215* (2013.01)

(58) Field of Classification Search
CPC .................. H04L 1/1835; H04W 72/1215
See application file for complete search history.

(56) References Cited

U.S. PATENT DOCUMENTS

2010/0050034 A1* 2/2010 Che ........................ H04L 1/1845
714/748
2011/0276852 A1* 11/2011 Mueller-Weinfurtner ...................
H04L 1/1812
714/749
(Continued)

FOREIGN PATENT DOCUMENTS

KR 1020100107418 10/2010
KR 1020140051410 4/2014
(Continued)

OTHER PUBLICATIONS

PCT International Application No. PCT/KR2015/009358, Written Opinion of the International Searching Authority dated Dec. 15, 2015, 19 pages.

*Primary Examiner* — Mohamed A Kamara
*Assistant Examiner* — Ryan C Kavleski
(74) *Attorney, Agent, or Firm* — Lee, Hong, Degerman, Kang & Waimey

(57) ABSTRACT

The present invention relates to a method and apparatus for operating a soft buffer for device-to-device (D2D) communication and eNode B-to-device (E2D) communication of a terminal in a wireless communication system. Specifically, the present invention comprises the steps of: receiving D2D communication data; and storing the D2D communication data in a soft buffer of a specific downlink hybrid automatic repeat and request (HARQ) process, wherein the specific (Continued)

downlink HARQ process is configured to support D2D communication among a plurality of downlink HARQ processes configured for E2D communication, and the step of storing the D2D communication data comprises: when E2D data are already stored in all soft buffer areas associated with the plurality of downlink HARQ processes, discarding the E2D data already stored in the soft buffer area of the specific downlink HARQ process and storing the D2D communication data therein.

9 Claims, 17 Drawing Sheets

(51) Int. Cl.
  *H04W 28/14* (2009.01)
  *H04W 72/12* (2009.01)

(56) References Cited

U.S. PATENT DOCUMENTS

| | | | |
|---|---|---|---|
| 2012/0057545 | A1 | 3/2012 | Hariharan et al. |
| 2014/0187283 | A1* | 7/2014 | Nimbalker ........... H04W 72/048 455/550.1 |
| 2015/0103752 | A1* | 4/2015 | Yu ....................... H04L 49/9005 370/329 |
| 2015/0180616 | A1* | 6/2015 | Lee ....................... H04L 1/1812 370/329 |
| 2016/0044707 | A1* | 2/2016 | Folke .................... H04W 76/14 370/329 |
| 2016/0088635 | A1* | 3/2016 | Davydov ............... H04L 1/1812 370/329 |

FOREIGN PATENT DOCUMENTS

| | | |
|---|---|---|
| KR | 1020140073532 | 6/2014 |
| WO | 2014007580 | 1/2014 |

\* cited by examiner

FIG. 2
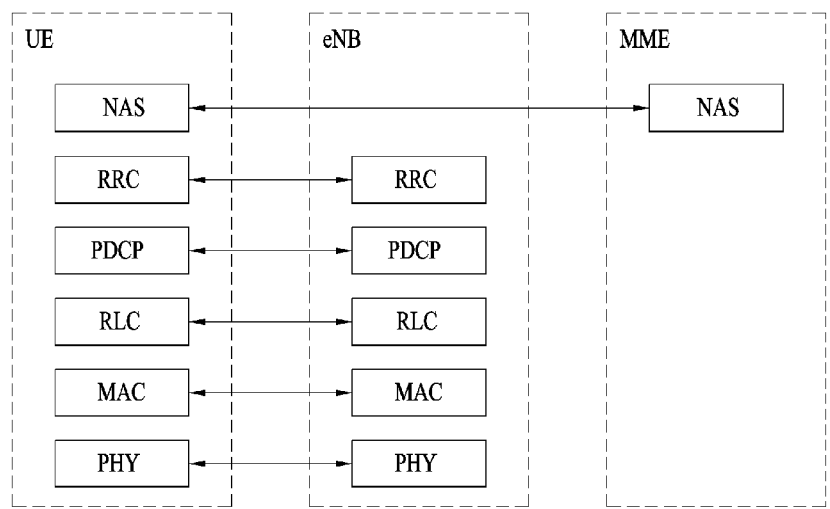
(a) control plane protocol stack
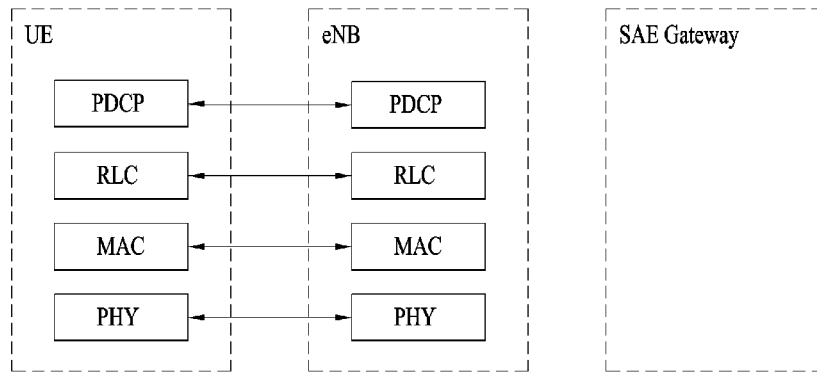
(b) user plane protocol stack FIG. 10
(a) 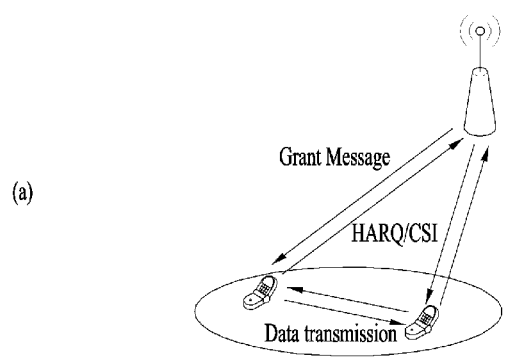
(b) 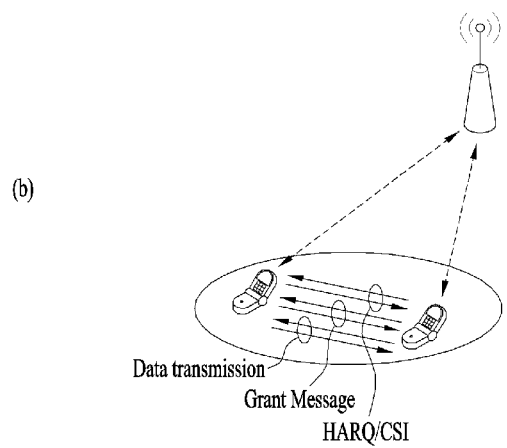

METHOD FOR OPERATING BUFFER FOR D2D COMMUNICATION AND WAN COMMUNICATION IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2015/009358, filed on Sep. 4, 2015, which claims the benefit of U.S. Provisional Application Nos. 62/046,144, filed on Sep. 4, 2014 and 62/082,599, filed on Nov. 20, 2014, the contents of which are all hereby incorporated by reference herein in their entirety.

TECHNICAL FIELD

The present invention relates to a wireless communication system, and more particularly, to a method of operating a buffer for D2D (device-to-device) communication and WAN (wide area network) communication in a wireless communication system and an apparatus therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

DISCLOSURE OF THE INVENTION

Technical Task

Based on the aforementioned discussion, the present invention intends to propose a method of operating a buffer for D2D (device-to-device) communication and WAN (wide area network) communication in a wireless communication system and an apparatus therefor.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To achieve these and other advantages and in accordance with the purpose of the present invention, as embodied and broadly described, according to one embodiment, a method of managing a soft buffer, which is managed by a user equipment (UE) for D2D (device-to-device) communication and E2D (eNode B-to-device) communication in a wireless communication system, includes the steps of receiving D2D communication data and storing the D2D communication data in a soft buffer of a specific downlink HARQ (hybrid automatic repeat and request) process. In this case, the specific downlink HARQ process is configured to support the D2D communication among a plurality of downlink HARQ processes configured for the E2D communication. If E2D data are previously stored in all of soft buffer areas associated with a plurality of the downlink HARQ processes, the D2D communication data storing step discards E2D data previously stored in a soft buffer area of the specific downlink HARQ process and stores the D2D communication data.

Preferably, the specific downlink HARQ process is configured to have a downlink HARQ process ID lower than IDs of the remaining downlink HARQ processes except the specific downlink HARQ process among a plurality of the downlink HARQ processes.

Preferably, if the E2D data previously stored in the soft buffer area of the specific downlink HARQ process is discarded, the method can further include the step of receiving RV (redundancy version) data of a predefined specific value again from an eNode B. More preferably, the D2D communication may correspond to Mode 1 D2D (device-to-device) communication.

Preferably, the D2D communication data storing step can be performed only when the UE transmits and receives a D2D signal using a D2D resource pool. More preferably, the D2D resource pool includes a resource section which is defined according to a predefined offset value.

Preferably, a size of the soft buffer of the specific downlink HARQ process can be determined according to the number of cells for which the D2D communication is set and the number of a plurality of the downlink HARQ processes.

Preferably, the specific downlink HARQ process may correspond to a sidelink process.

Preferably, if the E2D data does not exist in the soft buffer areas associated with a plurality of the downlink HARQ processes, the method can further include the step of determining the non-existence of the E2D data as transport block bits of maximum number received on a specific section are used for the D2D communication.

To further achieve these and other advantages and in accordance with the purpose of the present invention, according to a different embodiment, a user equipment managing a soft buffer for D2D (device-to-device) communication and E2D (eNode B-to device) communication in a wireless communication system includes a radio frequency unit and a processor, the processor configured to receive D2D communication data and store the D2D communication data in a soft buffer of a specific downlink HARQ (hybrid automatic repeat and request) process. In this case, the specific downlink HARQ process is configured to support the D2D communication among a plurality of downlink HARQ processes configured for the E2D communication. If E2D data are previously stored in all of soft buffer areas associated with a plurality of the downlink HARQ processes, E2D data previously stored in a soft buffer area of the specific downlink HARQ process is discarded and the D2D communication data is stored.

Advantageous Effects

According to embodiments of the present invention, it is able to efficiently perform HARQ buffer operation for D2D (device-to-device) communication and WAN (wide area network) communication in a wireless communication system.

It will be appreciated by persons skilled in the art that that the effects achieved by the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 2 is a diagram illustrating structures of a control plane and a user plane of a radio interface protocol between a user equipment and E-UTRAN based on the 3GPP radio access network standard;

FIG. 10 is a diagram for explaining D2D (UE-to-UE) communication;

BEST MODE

Mode for Invention

Figure 1:
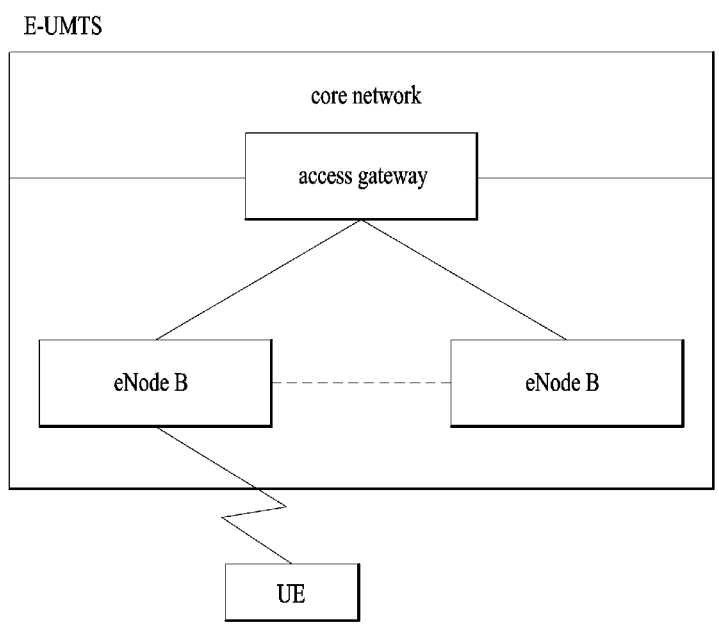
FIG. 1 is a schematic diagram of E-UMTS network structure as one example of a wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel The physical layer is connected to a medium access control (MAC) layer via a transport channel, wherein the medium access control layer is located above the physical layer. Data are transferred between the medium access control layer and the physical layer via the transport channel Data are transferred between one physical layer of a transmitting side and the other physical layer of a receiving side via the physical channel The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
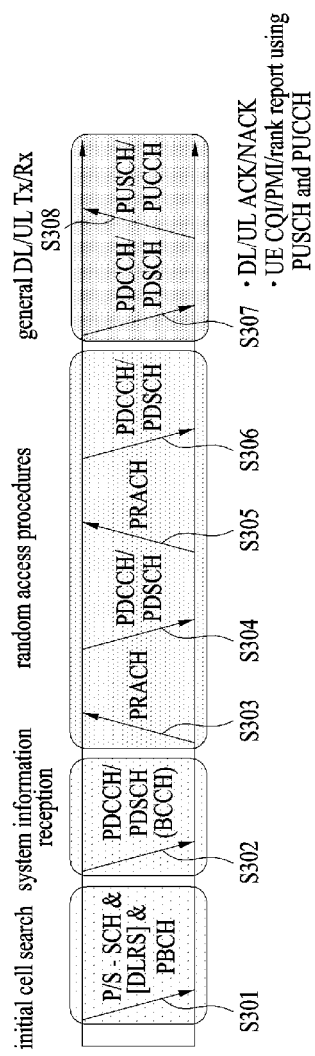
FIG. 3 is a diagram illustrating physical channels used in a 3GPP LTE system and a general method for transmitting a signal using the physical channels.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
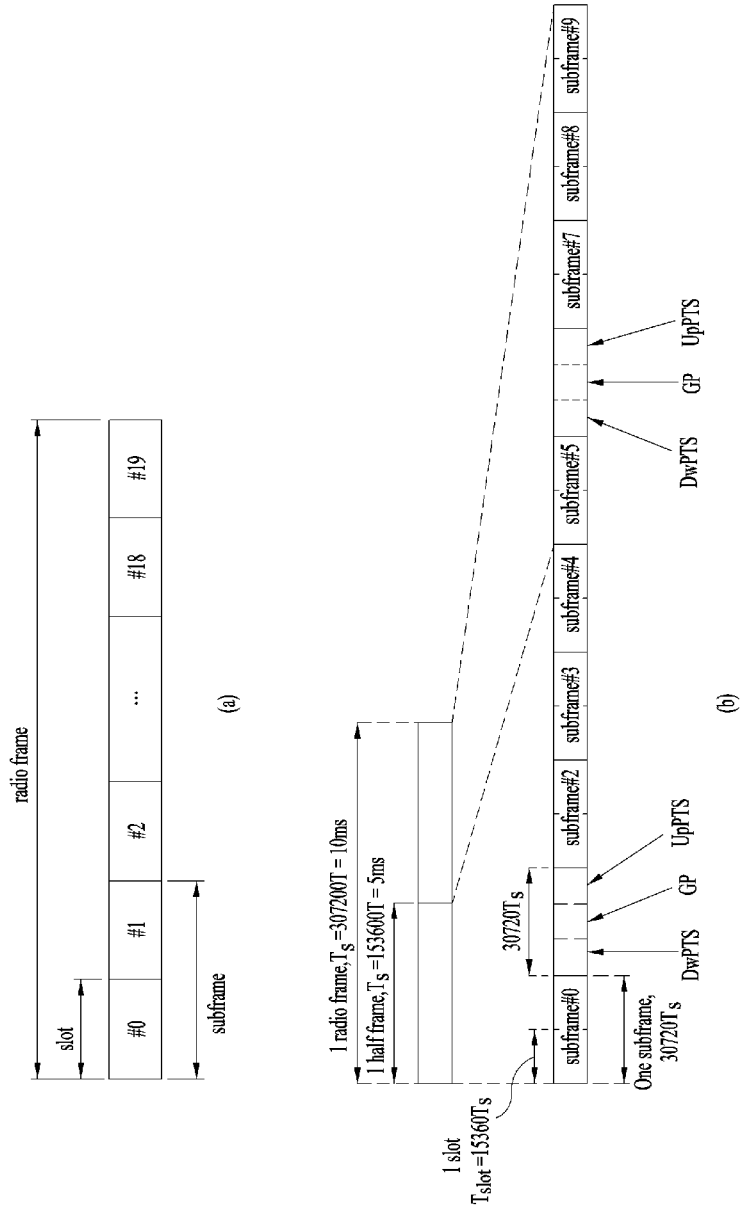
FIG. 4 is a diagram illustrating a structure of a radio frame used in an LTE system.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000\times2048)$, and the other region is configured for the guard period.

TABLE 1

|  |  | Normal cyclic prefix in downlink | | Extended cyclic prefix in downlink | | |
|---|---|---|---|---|---|---|
|  |  |  | UpTS | | | UpPTS |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5126 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
|  |  | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
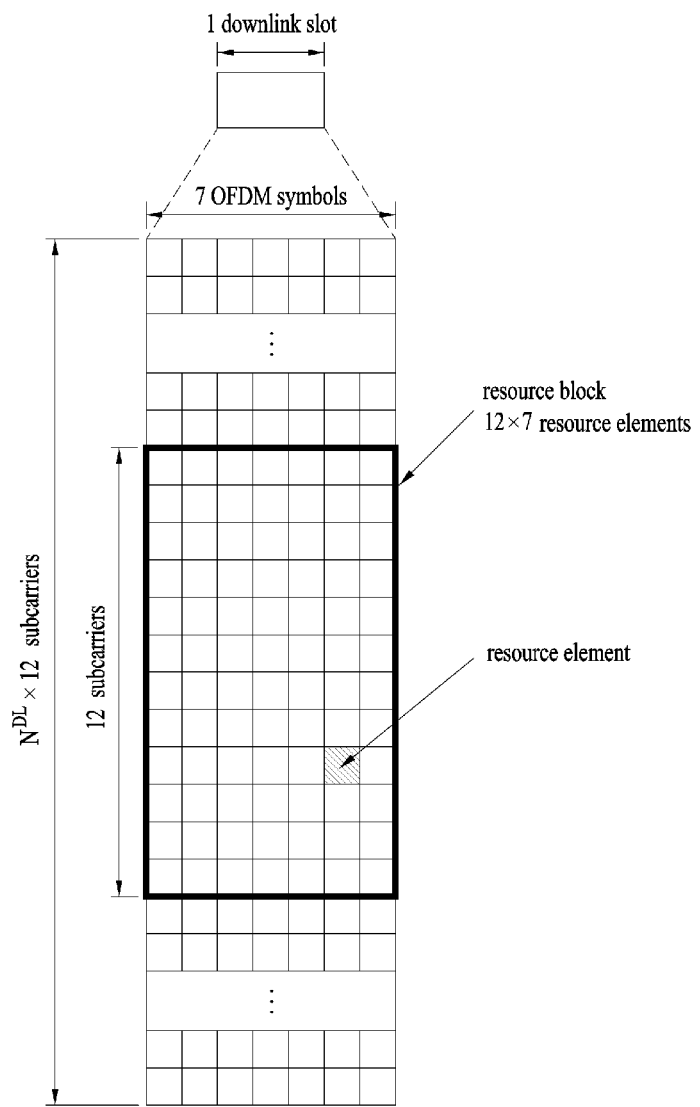
FIG. 5 is a diagram for an example of a resource grid for a downlink slot.

FIG. 5 is a diagram of a resource grid for a downlink slot.

Referring to FIG. 5, a DL slot includes $N_{symb}^{DL}$ OFDM symbols in time domain and $N_{RB}^{DL}$ resource blocks. Since each of the resource blocks includes $N_{SC}^{RB}$ subcarriers, the DL slot includes $N_{RB}^{DL} \times N_{SC}^{RB}$ subcarriers in frequency domain. FIG. 5 shows one example that the DL slot includes 7 OFDM symbols and that the resource block includes 12 subcarriers, by which the present invention is non-limited. For instance, the number of OFDM symbols included in the DL slot can be modified according to a length of a cyclic prefix (CP).

Each element on a resource grid is called Resource Element (RE) and 1 single resource element is indicated by a single OFDM symbol index and a single subcarrier index. A single RB is configured with $N_{symb}^{DL} \times N_{SC}^{RB}$ resource elements. The number $N_{RB}^{DL}$ of resource blocks included in the DL slot is dependent on a DL transmission bandwidth configured in a cell.

Figure 6:
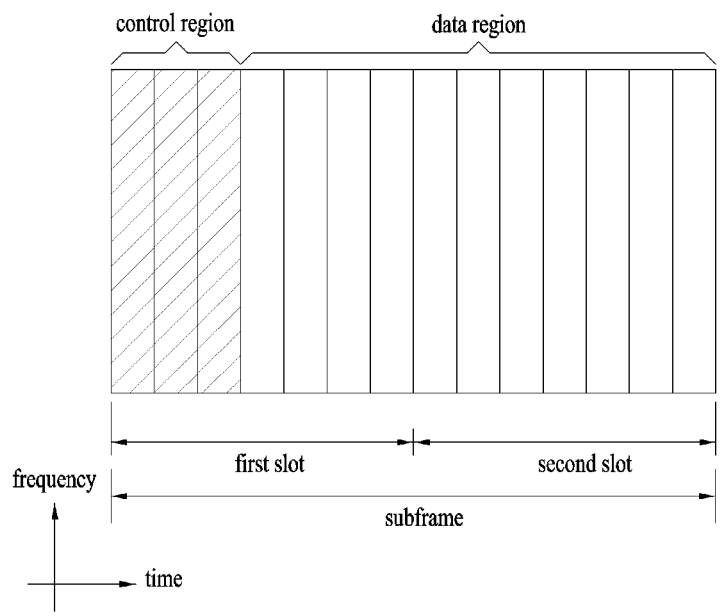
FIG. 6 is a diagram illustrating a structure of a downlink radio frame used in an LTE system.

FIG. 6 is a diagram illustrating a structure of a downlink subframe.

Referring to FIG. 6, maximum three (four) OFDM symbols located at the front of the first slot of the subframe correspond to a control region to which a control channel is allocated. The other OFDM symbols correspond to a data region to which a physical downlink shared channel (PDSCH) is allocated. Examples of downlink control channels used in the LTE system include a Physical Control Format Indicator Channel (PCFICH), a Physical Downlink Control Channel (PDCCH), and a Physical Hybrid ARQ Indicator Channel (PHICH). The PCFICH is transmitted from the first OFDM symbol of the subframe, and carries information on the number of OFDM symbols used for transmission of the control channel within the subframe. The PHICH carries HARQ ACK/NACK (Hybrid Automatic Repeat reQuest acknowledgement/negative-acknowledgement) signals in response to uplink transmission.

The control information transmitted through the PDCCH will be referred to as downlink control information (DCI). The DCI includes resource allocation information for a user equipment or user equipment group. For example, the DCI includes uplink/downlink scheduling information, uplink transmission (Tx) power control command, etc.

The PDCCH may include transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of transmission (Tx) power control commands of individual user equipments (UEs) within a random user equipment group, transmission (Tx) power control command, and activity indication information of voice over Internet protocol (VoIP). A plurality of PDCCHs may be transmitted within the control region. The user equipment may monitor the plurality of PDCCHs. The PDCCH is transmitted on aggregation of one or a plurality of continuous control channel elements (CCEs). The CCE is a logic allocation unit used to provide the PDCCH with a coding rate based on the status of a radio channel The CCE corresponds to a plurality of resource element groups (REGs). The format of the PDCCH and the number of available bits of the PDCCH are determined depending on the number of CCEs. The base station determines a PDCCH format depending on the DCI which will be transmitted to the user equipment, and attaches cyclic redundancy check (CRC) to the control information. The CRC is masked with an identifier (for example, radio network temporary identifier (RNTI)) depending on usage of the PDCCH or owner of the PDCCH. For example, if the PDCCH is for a specific user equipment, the CRC may be masked with cell-RNTI (C-RNTI) of the corresponding user equipment. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI).

Figure 7:
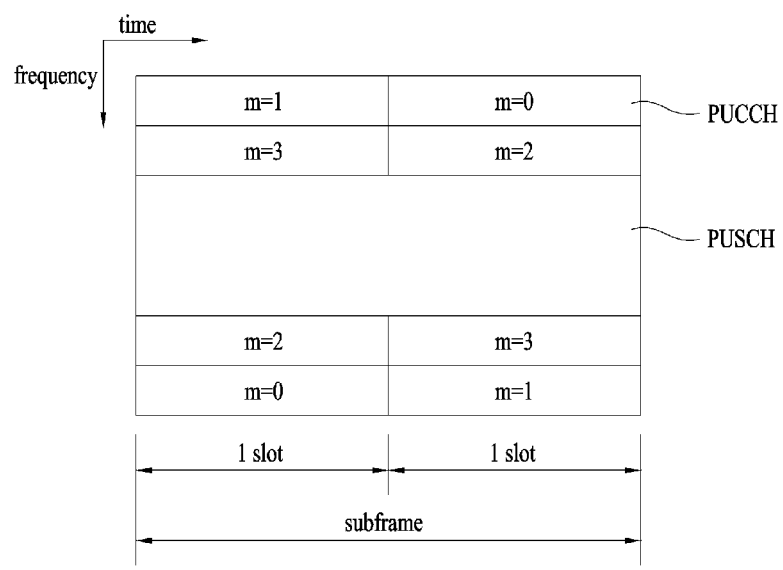
FIG. 7 is a diagram illustrating a structure of an uplink subframe used in an LTE system.

FIG. 7 is a diagram for an example of a structure of an uplink subframe in LTE.

Referring to FIG. 7, an uplink subframe includes a plurality of slots (e.g., 2 slots). A slot can include the different number of SC-FDMA symbols depending on a CP length. An uplink subframe is divided into a data region and a control region in frequency domain. The data region includes PUSCH and is used for transmitting a data signal such as audio and the like. The control region includes PUCCH and is used for transmitting uplink control information (UCI). PUCCH includes an RP pair positioned at both ends of the data region in frequency axis and hops at a slot boundary.

PUCCH can be used for transmitting control information described in the following.

SR (scheduling request): Information used for requesting uplink UL-SCH resource. OOK (on-off keying) scheme is used to transmit the SR.

HARQ ACK/NACK: Response signal for a DL data packet on PDSCH. This information indicates whether or not a DL data packet is successfully received. ACK/NACK 1 bit is transmitted in response to a single DL codeword. ACK/NACK 2 bits are transmitted in response to two DL codewords.

CSI (channel state information): Feedback information on a DL channel CSI includes a CQI (channel quality indicator) and MIMO (multiple input multiple output)-related feedback information includes an RI (rank indicator), a PMI (precoding matrix indicator), a PTI (precoding type indicator) and the like. 20 bits per subframe are used.

An amount of control information (UCI) capable of being transmitted by a user equipment in a subframe is dependent on the number of SC-FDMAs available for transmitting control information. The SC-FDMAs available for transmitting the control information correspond to the remaining SC-FDMA symbols except SC-FDMA symbols used for transmitting a reference signal in a subframe. In case of a subframe to which an SRS (sounding reference signal) is set, a last SC-FDMA symbol of a subframe is also excluded. A reference signal is used for coherent detection of PUCCH.

In the following, a HARQ (hybrid automatic repeat and request) in a wireless communication system is explained.

When there exist a plurality of UEs having data to be transmitted in UL/DL in a wireless communication system, a base station selects a UE to transmit the data from among a plurality of the UEs at every transmission unit time (transmission time interval (TTI) (e.g., subframe)). In particular, in a system using multiple carriers or a system similar to the system, the base station selects not only UEs to transmit data in UL/DL at every TTI but also a frequency band to be used by each of the selected UEs to transmit the data.

On the basis of UL, if the UEs transmit a reference signal (or pilot signal) to the base station in UL, the base station identifies channel states of the UEs using the reference signal received from the UEs and selects UEs to transmit data in UL on each unit frequency band at every TTI. The base station informs the UEs of a result of the selection. In particular, the base station transmits a UL assignment message to a UE UL scheduled at specific TTI to indicate the UE to transmit data using a specific frequency band. The UL assignment message is also referred to as a UL grant. The UE transmits the data in UL according to the UL assignment message. Basically, the UL assignment message includes information on a UE ID (UE identity), RB allocation information, payload, etc. In addition, the UL assignment message can include an IR (incremental redundancy) version, NDI (new data indication), and the like.

In case of using a synchronous non-adaptive HARQ scheme, when a UE scheduled at specific time performs retransmission, retransmission time is systematically promised between the UE and the base station (e.g., after 4 subframes from the timing at which NACK is received). Hence, the base station can transmit the UL grant message to the UE at the initial transmission only and the retransmission can be performed by ACK/NACK signal. On the contrary, in case of using an asynchronous adaptive HARQ scheme, since retransmission time is not promised between the base station and the UE, it is necessary for the base station to transmit a retransmission request message to the UE. Moreover, since a frequency resource for retransmission or MCS varies depending on transmission timing, the base station should transmit not only a UE ID, RB allocation information, and payload but also a HARQ process index, IR version, and NDI information to the UE at the time of transmitting the retransmission request message to the UE.

Figure 8:
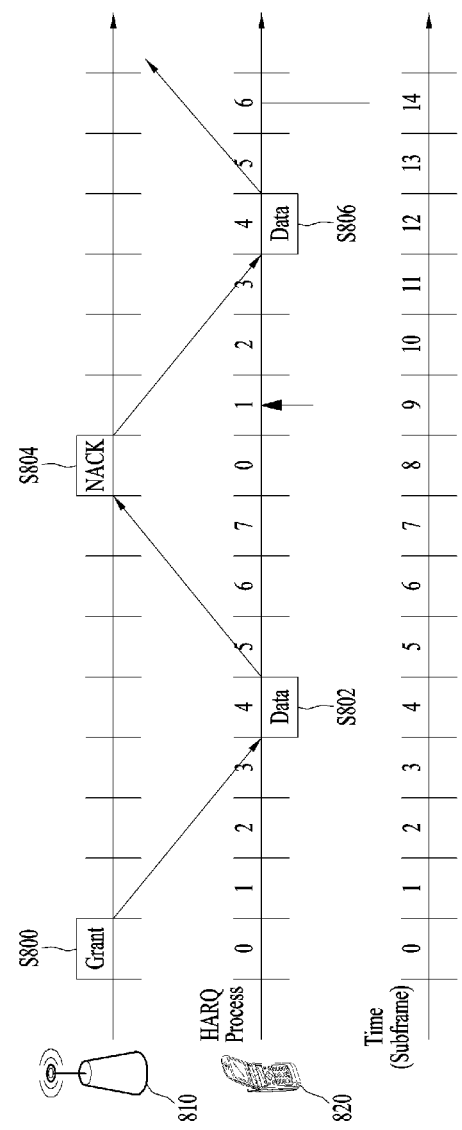
FIG. 8 illustrates a UL HARQ operation in LTE system.

FIG. 8 illustrates a UL HARQ operation in LTE system. In LTE system, a UL HARQ scheme uses synchronous non-adaptive HARQ. In case of using 8-channel HARQ, HARQ process numbers are given by 0 to 7. One HARQ process operates at every TTI (e.g., subframe). Referring to FIG. 8, a base station 810 transmits a UL grant to a UE 820 through PDCCH [S800]. The UE transmits UL data to the base station 810 using an RB designated by the UL grant and MCS after 4 subframes (e.g., subframe #4) from the timing (e.g., subframe #0) at which the UL grant is received [S802]. After the UL data received from the UE 820 is decoded, the base station 810 generates ACK/NACK. If the base station fails to decode the UL data, the base station 810 transmits NACK to the UE 820 [S804]. The UE 820 retransmits UL data to the base station after 4 subframes from the timing at which the NACK is received [S806]. In this case, the initial transmission and the retransmission of the UL data are performed by the same HARQ process (e.g., HARQ process 4).

In the following, DL/UL HARQ operation in FDD system is explained.

Figure 9:
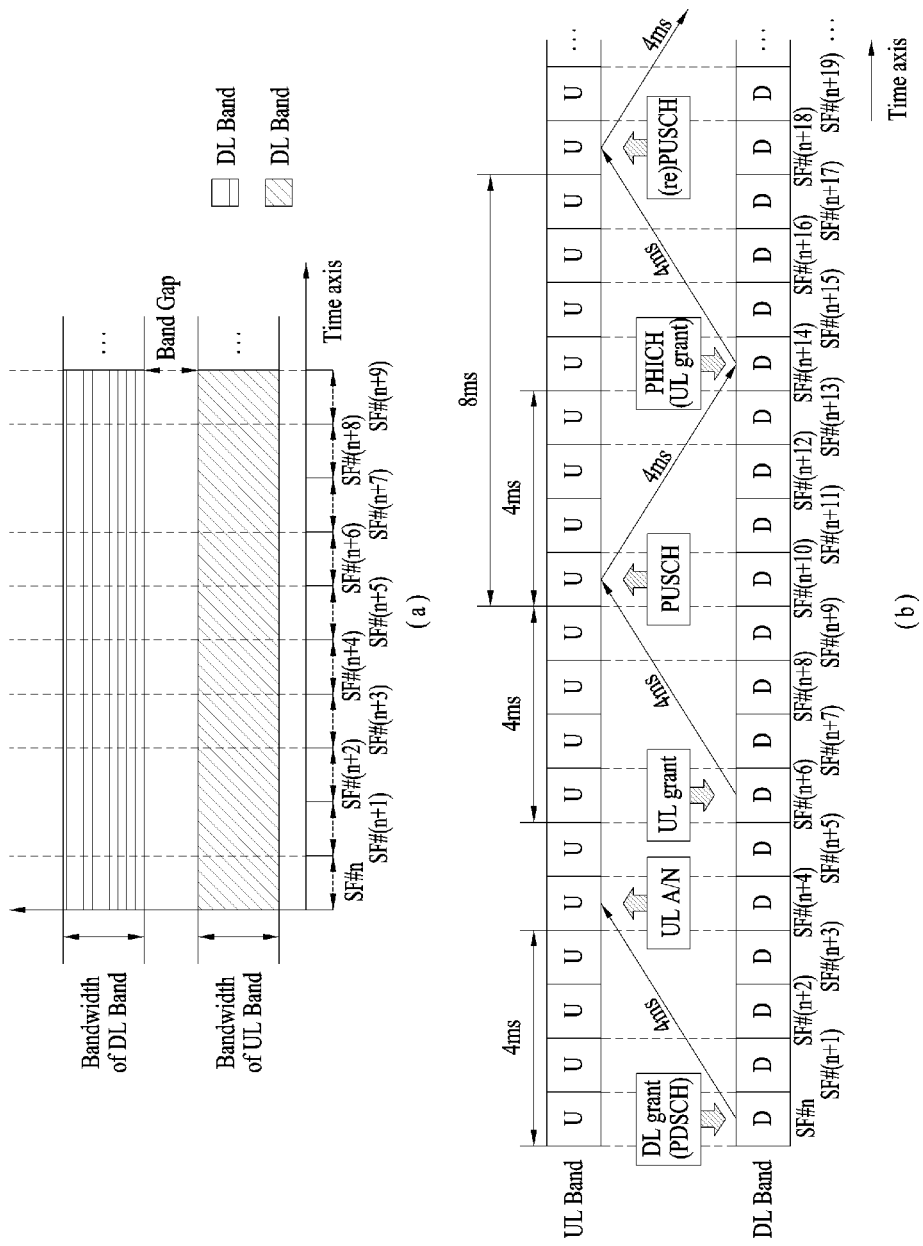
FIG. 9 is a diagram for explaining a FDD system and a DL/UL HARQ timeline.

FIG. 9 is a diagram for explaining a FDD system and a DL/UL HARQ timeline. In case of the FDD system illustrated in FIG. 9(a), transmission/reception of a DL/UL data corresponding to a specific UL/DL data is received after 4 ms. Referring to FIG. 9(b), for example, UL ACK/NACK is transmitted after 4 ms from the timing at which PDSCH/DL grant is received in response to the PDSCH, PUSCH is transmitted after 4 ms from the timing at which UL grant/PHICH is received in response to the UL grant/PHICH, and PHICH/UL grant is received after 4 ms from the timing at which PUSCH is transmitted/retransmitted in response to the PUSCH transmission/retransmission.

And, a synchronous HARQ scheme is used for a UL HARQ operation and an asynchronous HARQ scheme is used for a DL HARQ operation in 3GPP LTE system. The synchronous HARQ scheme corresponds to a scheme that retransmission is performed at a timing determined by a system when initial transmission fails. In particular, transmission/retransmission of UL data interlocked with a specific HARQ process or timing associated with a UL grant/PHICH timeline is defined in advance and it is difficult to randomly change the transmission/retransmission or the timing. On the contrary, according to the asynchronous HARQ scheme, when an initial transmission of data fails, retransmission of the data can be performed at a random timing appearing after 8 ms including the initial transmission timing.

In the aforementioned FIGS. 8 and 9, each of the HARQ processes is defined by a unique HARQ process identifier having a size of 3 bits and it is necessary for a receiving end (i.e., a UE in a DL HARQ process, an eNB in a UL HARQ process) to allocate an individual soft buffer to combine retransmitted data.

In the following, D2D (UE-to-UE communication) communication is explained.

A D2D communication scheme is mainly divided into a scheme of receiving a help from a network/coordination station (e.g., a base station) and a scheme of not receiving a help from the network/coordination station.

Referring to FIG. 10(a), a network/coordination station involves in transmitting and receiving a control signal (e.g., a grant message), HARQ, channel state information, etc. and data is transmitted and received only between UEs performing D2D communication. And, referring to FIG. 10(b), while a network provides minimum information (e.g., D2D connection information capable of being used in a cell) only, UE performing D2D communication form a link to transmit and receive data.

Based on the aforementioned contents, the present invention proposes a method of operating a buffer for supporting D2D (device-to-device) or E2D (eNB-to-UE) communication in environment in which the D2D and the E2D are performed together. In this case, the D2D communication means that a UE directly performs communication with a different UE using a radio channel In this case, although the UE corresponds to a terminal of a user, if such a network device as an eNB transmits and receives a signal according to a communication scheme between UEs, the network device can also be regarded as a sort of UEs.

In the following, for clarity, the present invention is explained based on a 3GPP LTE system. However, a range of systems to which the present invention is applied can be extended to other systems except the 3GPP LTE system.

And, the method proposed by the present invention can also be extensively applied to all cases that D2D communication is performed based on a predetermined time/frequency resource region in FDD system or TDD system. For example, the D2D communication can be performed by reusing a part of legacy radio resources or newly configuring (or allocating) a radio resource for the D2D communication in the FDD system or the TDD system.

Therefore, the methods proposed by the present invention can be extensively applied not only to a case of performing the D2D communication based on a legacy UL radio resource but also to a case of performing the D2D communication based on various types of radio resource regions defined in advance.

Moreover, the methods proposed by the present invention can also be extensively applied to a case that UEs participating in D2D communication perform communication with the same base station or a case that the UEs respectively perform communication with a different base station.

Figure 11:
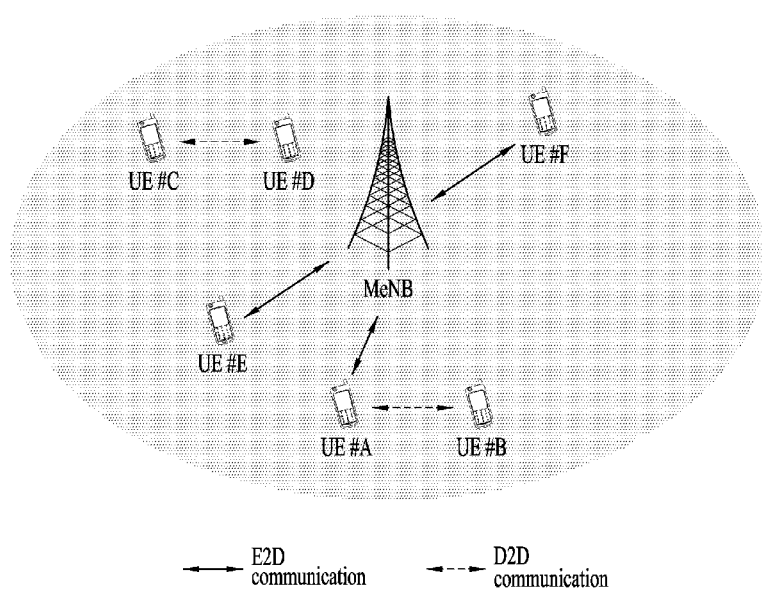
FIGS. 11 and 12 are diagrams for a case of reusing a partial region of a legacy uplink radio resource to perform D2D communication between UEs in a situation that D2D communication and eNB2D communication exist in a manner of being mixed in a network.
Figure 12:
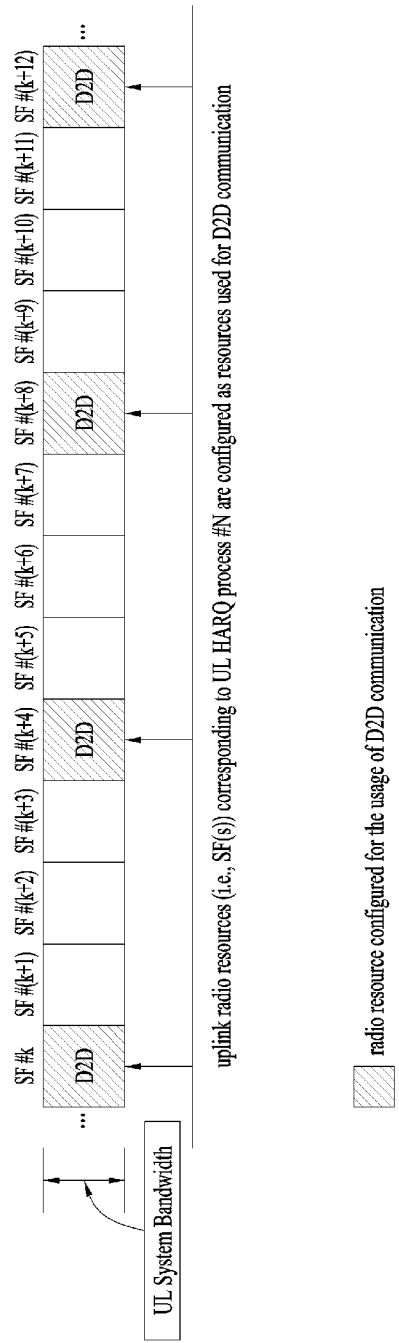

FIGS. 11 and 12 are diagrams for a case of reusing a partial region of a legacy uplink radio resource to perform D2D communication between UEs in a situation that D2D communication and eNB2D communication exist in a manner of being mixed in a network.

Referring to FIG. 11, D2D communication is performed between a UE #A and a UE #B or between a UE #C and a UE #D and E2D communication is performed between an MeNB and a UE #E, between the MeNB and a UE #F, and between the MeNB and the UE #A.

In a situation similar to FIG. 11, in order to perform D2D communication between UEs, as shown in FIG. 12, UL radio resources (i.e., subframes) corresponding to a UL HARQ process #N can be configured or allocated as resources used for D2D communication.

In FIG. 12, a FDD system is assumed. In order to minimize an impact of D2D communication that affects UL communication of a legacy D2eNB, UL radio resources corresponding to a specific UL HARQ process are configured to be reused for the D2D communication. Moreover, in FIG. 12, it may assume that UEs participating in the D2D communication perform ACK/NACK transmission to indicate whether or not D2D data is successfully received and perform D2D data retransmission based on a timeline of a legacy UL HARQ process (or timeline of DL HARQ process).

First of all, a method for a specific UE to efficiently operate (or manage) a soft buffer mounted on the UE to perform E2D communication and D2D communication together in such a situation as FIG. 11 and FIG. 12 is explained.

In the following, for clarity, assume that a soft buffer size per DL/UL HARQ process of a UE is configured by dividing "total DL/UL soft buffer size of a UE" by "the maximum number of HARQ processes used for DL/UL communication". However, the present invention can also be extensively applied to a case that the soft buffer size per DL/UL HARQ process of the UE is divided by a different scheme rather than the aforementioned assumption.

<Embodiment 1>

According to the embodiment 1 of the present invention, a base station can configure a part of a plurality of DL HARQ processes, which are set to a UE for DL communication in a legacy E2D direction, for a usage of D2D communication.

For example, the UE can receive information on the configuration of the usage of the D2D communication using a predetermined higher layer signal or a physical layer signal or via a predefined rule. Having received the information, the UE can use a soft buffer area interlocked with a corresponding DL HARQ process for the usage of D2D communication or a HARQ operation of the D2D communication.

According to the embodiment 1 of the present invention, the base station can inform the UE of information on DL HARQ processes in the legacy E2D direction, which is configured for the usage of the D2D communication, in such a form as identifiers (IDs) of the DL HARQ processes, and the like.

Figure 13:
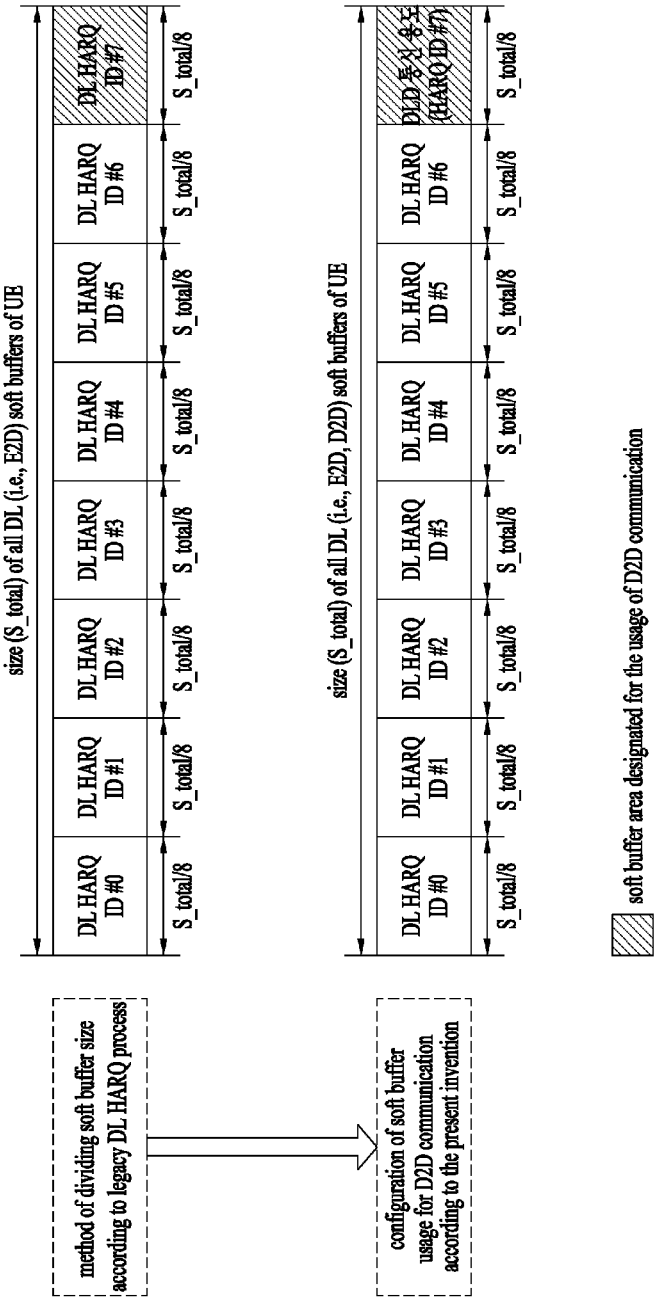
FIG. 13 is a diagram illustrating a case that a part of a plurality of downlink HARQ processes, which are configured for downlink communication in a legacy eNB2D direction, is configured for D2D communication according to embodiment of the present invention.

FIG. 13 is a diagram illustrating a case that a part of a plurality of downlink HARQ processes, which are configured for downlink communication in a legacy eNB2D direction, is configured for D2D communication according to the embodiment 1 of the present invention.

In FIG. 13, FDD system is assumed. In FIG. 13, it is assumed that a DL HARQ process among the total 8 DL HARQ processes, which are configured for DL communication in a legacy E2D direction, is designated for the usage of D2D communication. And, it is assumed that a soft buffer size per a legacy DL HARQ process is configured by dividing "total DL soft buffer size (S_total) of a UE" by "the maximum number of HARQ processes used for DL communication".

The embodiment 1 of the present invention is explained in the following with reference to FIG. 13. A base station can inform a UE of information indicating that a DL HARQ process #7 is configured for the usage of D2D communication among the total 8 DL HARQ processes configured for DL communication in E2D direction.

Having received the information, the UE can transmit ACK/NACK to the base station to indicate whether or not D2D data is successfully received and perform a D2D data retransmission operation using the DL HARQ process #7 having a soft buffer size of "S_total/8".

<Embodiment 2>

According to the embodiment 2 of the present invention, the base station can additionally inform the UE of information on the number of HARQ processes defined for the usage of D2D communication using a predetermined higher layer signal or a physical layer signal or via a predefined rule irrespective of a plurality of DL HARQ processes configured for DL communication in legacy E2D direction. Moreover, the information on the number of HARQ processes defined for the usage of D2D communication according to the embodiment 2 of the present invention can be transmitted together with information for the DL communication in the legacy E2D direction. Or, each of the information can be independently signaled to the UE.

For example, having received the information according to the embodiment 2 of the present invention, the UE may assume that the total number of the DL HARQ processes used for DL communication corresponds to the sum of the number of DL HARQ processes configured for DL communication in the legacy E2D direction and the number of HARQ processes additionally defined for the usage of D2D communication.

Hence, according to the embodiment 2 of the present invention, the UE can configure a soft buffer size per DL HARQ process by dividing "the total DL soft buffer size (S_total) of the UE" by "the number of DL HARQ processes configured for DL communication in legacy E2D direction+ the number of HARQ processes defined for the D2D communication usage".

Figure 14:
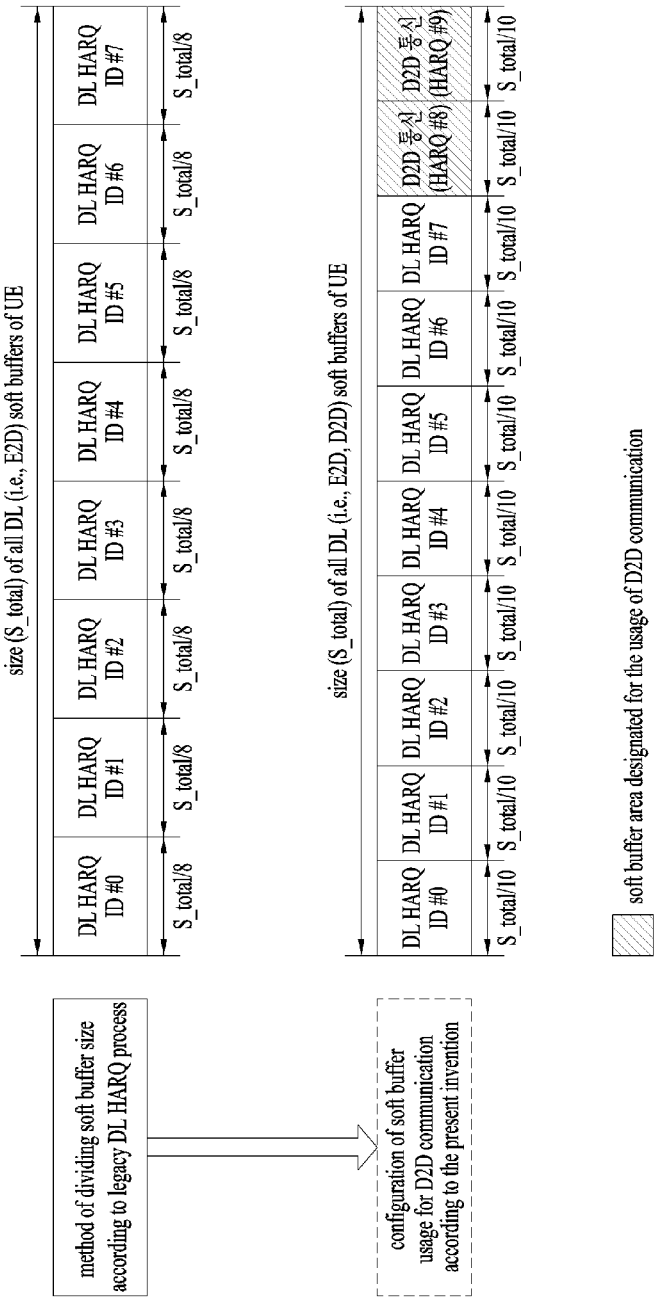
FIGS. 14 and 15 are diagrams illustrating a case of performing D2D communication or a HARQ operation of the D2D communication according to embodiment of the present invention.

FIG. 14 illustrates a case of performing D2D communication or HARQ operation of the D2D communication according to embodiment 2 of the present invention.

Referring to FIG. 14, a UE can perform D2D communication according to a predefined rule by assuming that there are 2 HARQ processes (e.g., a D2D communication HARQ process #8 and a D2D communication HARQ process #9) defined for the usage of D2D communication.

In particular, the UE may consider that the total number of DL HARQ processes used for DL communication corresponds to 10 corresponding to the sum of 8 DL HARQ processes configured for the DL communication in the legacy E2D direction and 2 HARQ processes defined for the usage of D2D communication.

Hence, the UE calculates a soft buffer size per DL HARQ process as "S_total/10" according to a predefined rule based on the information received from the base station.

By doing so, the UE can transmit ACK/NACK to the base station to indicate whether or not D2D data is successfully received and perform a D2D data retransmission operation using the two HARQ processes (i.e., a D2D communication HARQ process #8 and a D2D communication HARQ process #9), each of which has a soft buffer size of "S_total/10".

<Embodiment 3>

In embodiment 3 of the present invention, a case that at least one of the aforementioned embodiment 1 and the embodiment 2 is extensively applied is explained in consideration of a point that a specific UE may intend to transmit massive data to a different UE within a relatively short time.

In the embodiment 3 of the present invention, assume that a base station informs a UE of information on a downlink HARQ process used for the usage of D2D communication among the downlink HARQ processes in the legacy E2D direction according to the aforementioned embodiment 1 or informs the UE of information on the number of HARQ processes defined for the usage of D2D communication according to the embodiment 2 irrespective of the downlink HARQ processes in the legacy E2D direction.

In this case, according to the embodiment 3 of the present invention, the UE can allocate (or configure) a size of a soft buffer occupied by a specific HARQ process used for the usage of D2D communication relatively bigger than a size of a soft buffer occupied by a downlink HARQ process in E2D direction.

In this case, the base station can (explicitly) inform the UE of information on the size of the soft buffer occupied by the specific HARQ process used for the usage of D2D communication using a predefined higher layer signal or a physical layer signal. Or, the base station may (implicitly) inform the UE of the information through a predefined rule.

Alternately, the UE may determine the size of the soft buffer occupied by the specific HARQ process used for the usage of D2D communication based on a predefined rule. For example, if D2D communication is performed based on a legacy uplink radio resource, the size of the soft buffer occupied by the specific HARQ process used for the usage of D2D communication can be configured to be determined in advance according to a comparison result between an uplink system bandwidth and a downlink system bandwidth of a current system or a ratio value for the result.

Hence, if a size of the uplink system bandwidth on which D2D communication is performed is wider than a size of the downlink system bandwidth, it may be able to configure the size of the soft buffer occupied by the specific HARQ process used for the usage of D2D communication to be relatively bigger than the size of the soft buffer occupied by the downlink HARQ process in the E2D direction.

On the contrary, if the size of the uplink system bandwidth on which D2D communication is performed is narrower than the size of the downlink system bandwidth, it may be able to configure the size of the soft buffer occupied by the specific HARQ process used for the usage of D2D communication to be relatively smaller than the size of the soft buffer occupied by the downlink HARQ process in the E2D direction.

Similarly, if the size of the uplink system bandwidth on which D2D communication is performed is identical to the size of the downlink system bandwidth, it may be able to configure the size of the soft buffer occupied by the specific HARQ process used for the usage of D2D communication to be identical to the size of the soft buffer occupied by the downlink HARQ process in the E2D direction.

Moreover, the base station can inform the UE of information on a configuration for determining the size of the soft buffer occupied by the specific HARQ process used for the usage of D2D communication through a higher layer signal or a physical layer signal in advance.

In addition, the embodiment 3 of the present invention can also be extensively applied to a case that D2D communication is performed via predefined various types of radio resource regions and a case that the size of the soft buffer occupied by the specific HARQ process used for the usage of D2D communication relatively smaller than the size of the soft buffer occupied by the downlink HARQ process in the E2D direction is allocated (configured).

Figure 15:
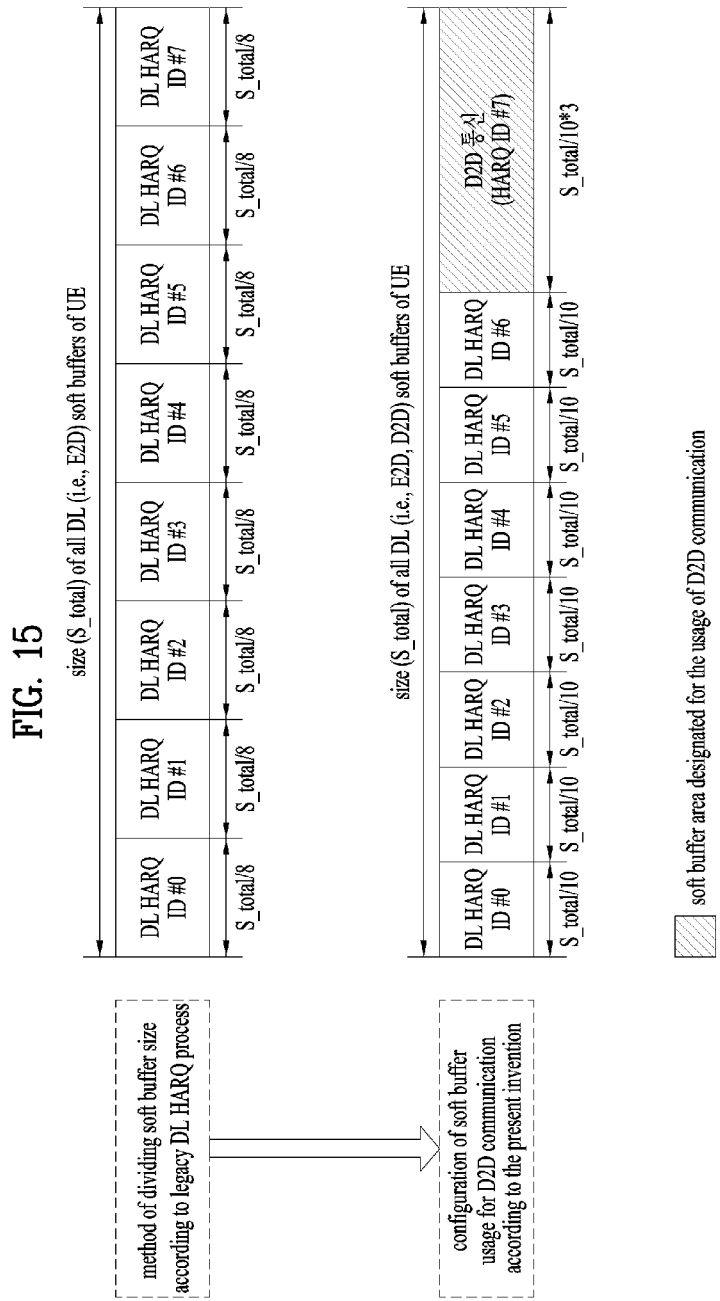

FIG. 15 shows a case of performing D2D communication or a HARQ operation of the D2D communication according to the embodiment 3 of the present invention under environment identical to the environment mentioned earlier in FIG. 13.

The base station can explicitly or implicitly informs the UE that a downlink HARQ process #7 is configured for the usage of D2D communication.

The UE can configure the size of the soft buffer occupied by the specific HARQ process used for the usage of D2D communication to be bigger or smaller than the size of the soft buffer occupied by the downlink HARQ process in the E2D direction.

For example, assume that the base station sets the size of the soft buffer occupied by the specific HARQ process used for the usage of D2D communication bigger than the size of the soft buffer occupied by the downlink HARQ process in the E2D direction as much as three times to the UE using a predefined higher layer signal or a physical layer signal or via a predefined rule. In this case, if the size of the soft buffer occupied by the downlink HARQ process in the E2D direction corresponds to "S_total/10", it may be able to configure the size of the soft buffer occupied by the specific HARQ process by "3*S_total/10".

In the following, methods capable of being additionally applied to the aforementioned embodiments 1 to 3 are explained.

First of all, according to the present invention, when each of UEs participating in D2D communication performs communication with a different base station, information on a downlink HARQ process configured or designated for the usage of D2D communication can be shared among a plurality of base stations via X2 interface or a predefined radio resource channel For example, each of a plurality of the base stations may share an identifier (ID) of the downlink HARQ process configured for the usage of D2D communication. By doing so, each of a plurality of the base stations corresponding to each UE performing D2D communication can efficiently support not only communication of a UE not performing D2D communication but also communication related to a D2D operation between UEs configured to perform communication with the base station in consideration of a resource used for the D2D communication and a downlink HARQ process.

And, according to the present invention, it may be able to configure UEs to share a downlink HARQ process using a specific soft buffer area for D2D communication and a downlink HARQ process in legacy E2D direction with each other based on a predefined priority rule.

For example, it may be able to configure the downlink HARQ process in the E2D direction to preferentially use the specific soft buffer area prior to the downlink HARQ process used for the usage of D2D communication.

In addition, if downlink communication load in E2D direction is not high at specific timing or all downlink soft buffer areas of a UE are not occupied by downlink HARQ processes in E2D direction, it may be able to configure a specific downlink HARQ process used for the usage of D2D communication to operate using a predefined specific soft buffer area. Of course, it may also be able to configure the specific downlink HARQ process used for the usage of D2D communication to operate using a soft buffer area not used by the downlink HARQ process in E2D direction instead of the specific soft buffer area.

On the contrary, as the load of the downlink communication in E2D direction increases at specific timing, if it is necessary for downlink HARQ processes in E2D direction to use all downlink soft buffer areas of a UE, it may be able to configure a currently operating specific downlink HARQ process used for D2D communication to be omitted or forcibly terminated. In particular, it may be able to configure a specific soft buffer area, which is occupied by the forcibly terminated downlink HARQ process used for D2D communication, to be used for the downlink HARQ processes in E2D direction again.

Moreover, the UE may assume that the specific downlink HARQ process used for D2D communication, which is omitted or forcibly terminated, successfully terminates communication all the time and it may be able to configure the UE to transmit ACK to a higher layer of the UE. On the contrary, the UE may assume that the specific downlink HARQ process used for D2D communication, which is omitted or forcibly terminated, fails in performing communication all the time and it may be able to configure the UE to transmit NACK to a higher layer of the UE.

Although the aforementioned proposed method is explained centering on a case that a downlink HARQ process in E2D direction preferentially uses a specific soft buffer area prior to a downlink HARQ process used for the usage of D2D communication, the method can be identically applied to a case that the downlink HARQ process used for the usage of D2D communication is configured to preferentially use the specific soft buffer area prior to the downlink HARQ process in E2D direction.

And, according to the present invention, a base station can adjust a TBS (transport block size) for specific communication again in consideration of the decrease of a buffer size interlocked with a specific HARQ process.

For example, when the entire soft buffer areas of a UE are divided into the number of HARQ processes greater than the legacy number according to the embodiment 2 or the embodiment 3 of the present invention, a base station can adjust a transport block size for specific communication again in consideration of the decrease of a buffer size interlocked with a specific HARQ process. Or, in order to support various types of communications (e.g., E2D, D2D communication) including a different property (e.g., data size) of transmission/reception data at the same time, when a soft buffer size occupied by a HARQ process interlocked with specific communication and a soft buffer size occupied by a HARQ process of a different communication are asymmetrically divided, a base station may readjust a TBS (transport block size) for specific communication (e.g., E2D) in consideration of the property (i.e., decrease of a buffer size interlocked with a specific HARQ process).

Moreover, in order to support an operation related to the readjustment of the transport block size of the base station, it may be able to configure the UE to inform the base station of information on whether or not the UE performs communication of a property (e.g., D2D communication) different from the legacy property of the UE through a predefined channel.

Information or a signal, which is additionally transmitted to the base station to inform the base station of information on whether or not the UE performs a specific communication, may correspond to a message for requesting readjustment of a transport block size of corresponding communication in consideration of a change of a soft buffer size interlocked with a legacy communication (or specific communication).

According to the present invention, it may be able to configure a UE to perform D2D communication by reusing or applying a soft buffer division method in environment to which a carrier aggregation (CA) technique is applied under an assumption that the D2D communication is performed based on a virtual component carrier (CC). Moreover, a base station can inform a UE of information on the D2D communication in the CA environment and information on whether to apply the D2D communication through a predetermined higher layer signal or a physical layer signal.

Hence, the UE assumes that the D2D communication is performed based on a virtual component carrier irrespective of communication in E2D direction. In this case, the UE considers that communication is performed based on two component carriers (i.e., component carrier for E2D communication and component carrier for D2D communication). The UE divides the entire soft buffers of the UE based on the two component carriers and may be able to divide the each of the divided soft buffers again into the number of HARQ processes interlocked with each communication (or each component carrier). In particular, it may reuse a soft buffer division method according to the present invention in environment to which a CA (carrier aggregation) technique is applied. After the aforementioned process is performed, the UE uses one of the divided soft buffer areas for E2D communication and may be able to use the rest of divided soft buffer areas for D2D communication.

In the following, a method for a D2D UE to efficiently manage a soft buffer to support both D2D (device-to-device) communication and E2D (eNB-to-device) communication at the same time is explained. The method can be additionally applied to the embodiments of the present invention.

First of all, when D2D communication is performed, a resource configuration/allocation is additionally explained. For clarity, a UE configured to transmit a D2D signal is defined as "D2D TX UE" and a UE configured to receive a D2D signal is defined as "D2D RX UE".

In general, when a UE performs communication with a different UE using a direct radio channel, an RU (resource unit) corresponding to a specific resource is selected from a resource pool corresponding to a set of contiguous resources and the UE can be configured to transmit a D2D signal (i.e., operation of a D2D TX UE) using the selected RU. Information on the resource pool capable of being used by the D2D TX UE to transmit a signal is signaled to the D2D RX UE and the D2D RX UE detects a signal transmitted by the D2D TX UE in the resource pool. In this case, i) if the D2D TX UE is located within a connection rage of a base station, the base station can inform the D2D TX UE of the information on the resource pool. ii) If the D2D TX UE is located at the outside of the connection rage of the base station, the information on the resource pool can be informed by a different UE or can be determined by a predetermined resource.

In general, a resource pool includes a plurality of resource units (RUs). A UE selects one or more resource units (RUs) from the resource pool and may be then able to use the selected RUs to transmit a D2D signal of the UE.

Figure 16:
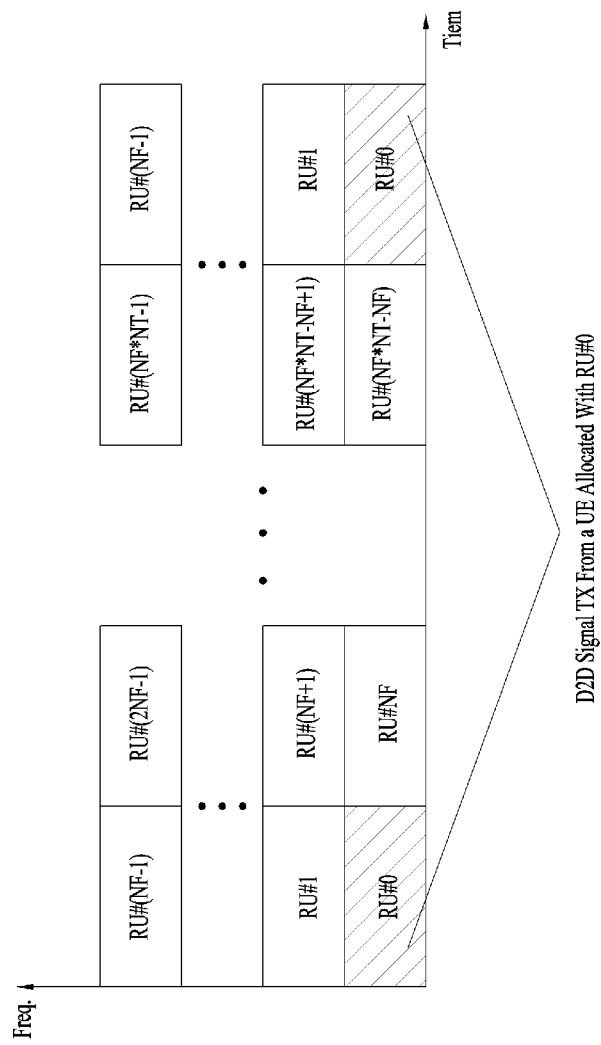
FIG. 16 is a diagram for explaining a resource unit for transmitting a D2D signal according to the present invention.

FIG. 16 is a diagram for explaining an example of configuring a resource unit (RU) for D2D communication. Referring to FIG. 16, the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIG. 16, one resource unit (RU) may periodically and repeatedly appear. Or, an index of a physical resource unit (RU) to which a logical resource unit (RU) is mapped may change with a predetermined pattern according to time to obtain a diversity gain in time domain and/or frequency domain. In this resource unit structure, a resource pool may correspond to a set of resource units capable of being used by a UE intending to transmit a D2D signal.

Moreover, the resource pool can be classified into various types. First of all, the resource pool can be classified according to content of a D2D signal transmitted via each resource pool. For example, the content of the D2D signal can be classified as follows. It may configure a separate resource pool in response to each of the contents.

SA (scheduling assignment): An SA signal may correspond to a signal including information on a resource position of a D2D data channel, information on MCS (modulation and coding scheme) necessary for modulating and demodulating a data channel, information on a MIMO transmission scheme, and the like. The SA signal can be transmitted on an identical resource unit in a manner of being multiplexed with D2D data. In this case, an SA resource pool may correspond to a pool of resources that an SA and D2D data are transmitted in a manner of being multiplexed.

D2D data channel: The D2D data channel corresponds to a resource pool used by a D2D TX UE to transmit user data using a resource designated by SA. If SA information and a D2D data channel are transmitted in a manner of being multiplexed in an identical resource unit, the D2D data channel except the SA information is transmitted only in the resource pool for the D2D data channel In other word, an RE (resource element), which is used to transmit SA information in a specific resource unit of an SA resource pool, can also be used for transmitting D2D data in a D2D data channel resource pool.

Discovery message: The discovery message may correspond to a resource pool for a message that enables a neighbor UE to discover a D2D TX UE. In this case, the D2D TX UE transmits information such as ID of the D2D TX UE, and the like to the neighbor UE.

And, as mentioned in the foregoing description, although contents of D2D signal are identical to each other, it may use a different resource pool according to a transmission/reception attribute of the D2D signal. For example, in case of the same D2D data channel or the same discovery message, the D2D data channel or the discovery message can be classified into a different resource pool according to i) a transmission timing determination scheme of a D2D signal (e.g., a scheme of transmitting a D2D signal at the time of receiving a synchronization reference signal, a scheme of transmitting a D2D signal by applying a certain TA (timing advance) to the D2D signal at the time of receiving a synchronization reference signal), ii) a resource allocation scheme (e.g., a scheme that a cell designates a transmission resource of an individual signal to an individual D2D TX UE, a scheme that an individual D2D TX UE autonomously selects an individual signal transmission resource from a pool), and iii) a signal format (e.g., the number of symbols occupied by a D2D signal in a subframe, the number of subframes used for transmitting a D2D signal).

Moreover, a method of allocating a resource for transmitting a D2D data channel can be classified into two modes described in the following.

Mode 1: The mode 1 corresponds to a scheme that a cell directly designates a resource used for transmitting SA and D2D data to an individual D2D TX UE. As a result, the cell is able to precisely identify a resource and a UE used for transmitting a D2D signal. Yet, if the cell designates a D2D resource whenever a D2D signal is transmitted, it may cause excessive signaling overhead. Hence, the cell may be able to allocate a plurality of SAs and/or a data transmission resource via single signaling.

Mode 2: The mode 2 corresponds to a scheme that an individual D2D TX UE selects an appropriate resource from a series of (contiguous) SAs and a data-related resource pool, which are set to a plurality of D2D TX UEs by a cell, to transmit SA and data. As a result, the cell is unable to precisely identify a UE and a resource used for performing D2D transmission.

And, a method of allocating a resource for transmitting a discovery message can be classified into two types described in the following.

Type 1: The type 1 corresponds to a discovery procedure when a resource is allocated to transmit a non-UE-specific based discovery signal. In this case, the resource can be used for all UEs or a group of UEs.

Type 2: The type 2 corresponds to a discovery procedure when a resource is allocated to transmit a UE-specific based discovery signal.

Type 2A: A resource is allocated at every specific transmission time (instance) of each of discovery signals.

Type 2B: A resource is semi-persistently allocated to transmit a discovery signal.

Figure 17:
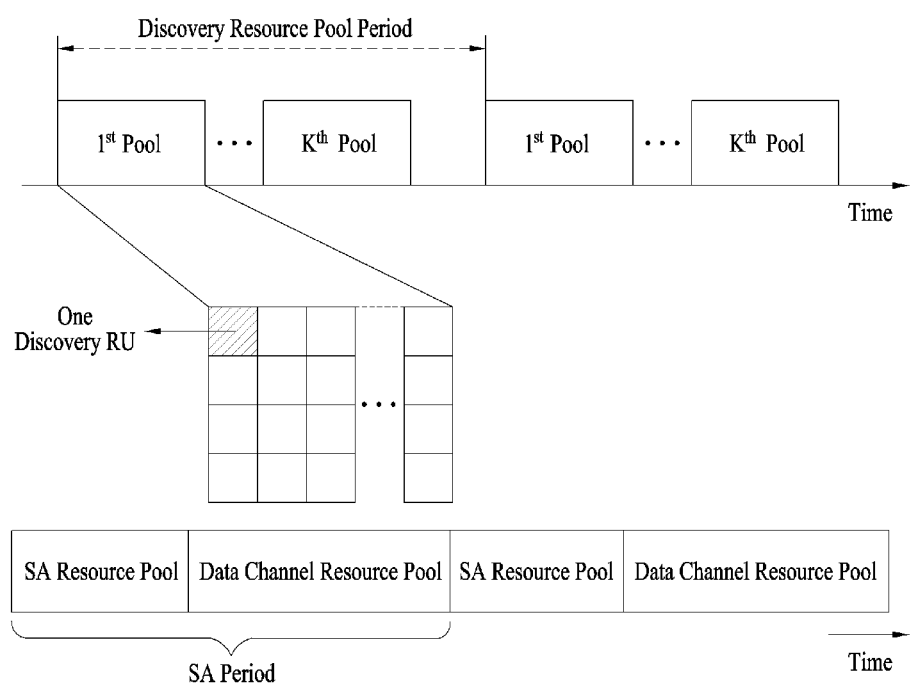
FIG. 17 is a diagram for explaining a periodically appearing resource pool for a discovery message (DS message) according to the present invention.

FIG. 17 shows a case that a discovery message-related resource pool (hereinafter, discovery resource pool) periodically appears. In FIG. 17, a period of which the resource pool appears is represented as "discovery resource pool period". And, in FIG. 17, among a plurality of discovery resource pools which are configured within (one) discovery resource pool period, a specific discovery resource pool(s) is defined as a serving cell-related discovery transmission/reception resource pool(s) and other (remaining) discovery resource pool(s) can be defined as a neighbor cell-related discovery reception resource pool(s).

<Embodiment 4>

According to the present invention, a D2D UE can be configured to manage a soft buffer for D2D communication and/or E2D communication according to at least a part (i.e., all or a part) of a rule #4-A and a rule #4-B described in the following.

Rule #4-A: According to the rule #4-A, when a soft buffer area of a predetermined ratio is used for D2D communication among the whole of cell-related soft buffer areas to which D2D communication is set, an operation described in the following can be performed.

For example, when the entire soft buffer areas (related to a cell for which D2D communication is set) are fully filled with E2D communication-related reception data and D2D communication-related reception data, if E2D communication-related data is additionally received, it is able to configure a D2D UE to discard D2D data stored in a soft buffer area of a predefined ratio used for D2D communication and store a newly received ED2D communication-related data in the emptied soft buffer area.

Specifically, among the entire soft buffer areas (hereinafter, "TOTAL_SIZE") related to a cell (e.g., FDD CELL) for which D2D communication is set, when a partial soft buffer area (i.e., 'TOTAL_SIZE/8') corresponding to 1/8 ratio of the entire soft buffer areas is configured to be used for D2D communication and the entire soft buffer areas are fully filled with E2D communication-related reception data and D2D communication-related reception data (i.e., data of 7 DL HARQ processes related to E2D communication are stored in '7*TOTAL_SIZE/8' areas and D2D communication-related data are stored in the remaining 'TOTAL_SIZE/8' areas), if E2D communication-related data is additionally received, a D2D UE discards the D2D data stored in the 'TOTAL_SIZE/8' area and stores the newly received E2D communication-related data in the emptied soft buffer area (i.e., 'TOTAL_SIZE/8').

As a different example, when the entire soft buffer areas (related to a cell for which D2D communication is set) are not fully filled with E2D communication-related reception data and D2D communication-related reception data, if E2D communication-related data is additionally received, it is able to configure a D2D UE to store the newly received E2D communication-related data in a unused soft buffer area.

Specifically, among the entire soft buffer areas (hereinafter, "TOTAL_SIZE") related to a cell (e.g., FDD CELL) for which D2D communication is set, when a partial soft buffer area (i.e., 'TOTAL_SIZE/8') corresponding to 1/8 ratio of the entire soft buffer areas is configured to be used for D2D communication and the entire soft buffer areas are not fully filled with E2D communication-related reception data and D2D communication-related reception data (i.e., data of 6 DL HARQ processes related to E2D communication are stored in '6*TOTAL_SIZE/8' areas and D2D communication-related data are stored in the 'TOTAL_SIZE/8' areas), if E2D communication-related data is additionally received, a D2D UE does not discard the D2D data stored in the 'TOTAL_SIZE/8' area and stores the newly received E2D communication-related data in the unused remaining 'TOTAL_SIZE/8' areas.

And, it is able to comprehend the rule #4-A as E2D communication has priority higher than priority of D2D communication.

Rule #4-B: According to the rule #4-B, when a specific DL HARQ process (related to a cell for which D2D communication is set) is borrowed for the usage of D2D communication or a soft buffer area of a specific DL HARQ process (related to a cell for which D2D communication is set) is borrowed for the usage of D2D communication, an operation described in the following can be performed.

For example, when the entire soft buffer areas (related to a cell for which D2D communication is set) are fully filled with E2D communication-related reception data, if D2D communication-related data is additionally received, it is able to configure a D2D UE to discard E2D data stored in a soft buffer area of a specific DL HARQ process and store a newly received D2D communication-related data in the emptied soft buffer area.

Specifically, when a DL HARQ process #X, which is related to a cell (e.g., FDD cell) for which D2D communication is set, is configured to be borrowed for the usage of D2D communication and the entire soft buffer areas are fully filled with E2D communication-related reception data (i.e., when data of 8 DL HARQ processes related to E2D communication including the DL HARQ process #X are stored in 'TOTAL_SIZE' area), if D2D communication-related data is additionally received, a D2D UE discards the E2D data stored in the soft buffer area (i.e., 'TOTAL_SIZE/8') of the DL HARQ process #X and stores the newly received D2D communication-related data in the emptied soft buffer area.

As a different example, when the entire soft buffer areas (related to a cell for which D2D communication is set) are not fully filled with E2D communication-related reception data, if D2D communication-related data is additionally received, it is able to configure a D2D UE to store the newly received D2D communication-related data in an unused soft buffer area.

Specifically, when a DL HARQ process #X, which is related to a cell (e.g., FDD cell) for which D2D communication is set, is configured to be borrowed for the usage of D2D communication and the entire soft buffer areas are not fully filled with E2D communication-related reception data (i.e., when data of the DL HARQ process #X related to E2D communication are stored in 'TOTAL_SIZE/8' area and 6 DL HARQ processes related to E2D communication are stored in '6*TOTAL_SIZE/8' areas), if D2D communication-related data is additionally received, a D2D UE does not discard the E2D data stored in the soft buffer area (i.e., 'TOTAL_SIZE/8') of the DL HARQ process #X and stores the newly received D2D communication-related data in an unused remaining 'TOTAL_SIZE/8' area.

As a further different example, it is able to comprehend the rule #4-B as D2D communication has priority higher than priority of E2D communication. Or, a DL HARQ process borrowed for the usage of D2D communication can be (implicitly) defined by a DL HARQ process of a lowest ID (i.e., it may obtain a common UE operation irrelevant to TDD/FDD system or commonality of a discarded E2D communication-related DL HARQ process ID). For similar comprehension, a DL HARQ process borrowed for the usage of D2D communication can be (implicitly) defined by a DL HARQ process of a highest ID value.

If reception data information of a specific RV (redundancy) related to E2D communication is discarded by applying the rule #4-B, it may be able to configure an eNB to retransmit data of an RV of a predefined specific value instead of data of a next RV in consideration of the discarded reception data information. This can be especially effective for Mode 1 D2D communication that an eNB is able to identify a time/frequency resource used for a D2D UE to perform D2D communication. In this case, the RV of the specific value can be configured by '0' (e.g., a legacy E2D communication-related data is retransmitted in such an RV order as '0, 2, 3, 1').

<Embodiment 5>

It may configure the aforementioned embodiments 1 to 4, the embodiments/rules/configurations mentioned earlier in additional method related to the embodiments 1 to 4, and embodiments 6 and 7 described in the following to be restrictively applied to the D2D signal reception-related resource pool (or D2D signal-related transmission/reception resource pool) section mentioned earlier with reference to FIGS. 16 and 17 only. In other word, a legacy soft buffer management scheme (i.e., a soft buffer management scheme of a non-D2D UE) is applied at the outside of the D2D signal reception-related resource pool (or D2D signal-related transmission/reception resource pool) section.

In this case, when the embodiment 5 is applied, an eNB performs (downlink) E2D communication in consideration of a soft buffer management scheme of a UE applied at a specific section. And, the application of the embodiment 5 can be interpreted as TDM (time division multiplexing) is performed on a different soft buffer management scheme.

And, if the embodiment 5 is applied for a discovery signal reception (discovery signal RX) resource pool (or discovery signal transmission/reception resource pool (discovery signal TX/RX resource pool) which is defined or appears with a relatively long period, it may reduce an impact of D2D communication influencing on an E2D communication-related soft buffer size. In particular, the entire soft buffer areas can be utilized for the usage of E2D communication by applying a legacy soft buffer management scheme at the outside of the discovery signal reception resource pool (or discovery signal transmission/reception resource pool) section.

And, it may be able to configure the aforementioned embodiments 1 to 4, the embodiments/rules/configurations mentioned earlier in additional method related to the embodiments 1 to 4, and embodiments 6 and 7 described in the following to be applied to an extended section including a D2D signal reception-related resource pool (or a D2D signal-related transmission/reception resource pool) based on a predefined or signaled offset value (hereinafter, 'OFFSET_M2').

As a concrete example, if a D2D signal reception-related specific resource pool section is configured by radio frames ranging from a radio frame #N to a radio frame #(N+K), a section to which the embodiments 1 to 4, the embodiments/rules/configurations mentioned earlier in additional method related to the embodiments 1 to 4, and embodiments 6 and 7 described in the following are applied can be considered as i) radio frames ranging from a radio frame #(N-OFFSET_M2) to a radio frame #(N+K) (i.e., a scheme that the OFFSET_M2 is applied to a start point of a resource pool section only) or can be defined by ii) radio frames ranging from a radio frame #(N-OFFSET_M2) to a radio frame #(N+K+OFFSET_M2) (i.e., a scheme that the OFFSET_M2 is applied to both a start point and an end point of a resource pool section). In this case, assume that a value of the OFFSET_M2 corresponds to a positive integer (or an integer which is not a negative number).

<Embodiment 6>

It may be able to configure the embodiment 2 to be restrictively applied only when the maximum number of DL HARQ processes of a specific cell related to E2D communication (and/or D2D communication) is smaller than a predefined or signaled threshold value. In this case, the threshold value can be configured by 8. And, application of the embodiment 6 can be interpreted as an additional (or independent) HARQ process for D2D communication is configured only when soft buffers are divided by the maximum number of DL HARQ processes of a relatively smaller value (e.g., the maximum number of DL HARQ processes related to TDD UL-DL configuration #0/1/6 is defined by 4/7/6, respectively). By doing so, it may be able to prevent an E2D communication-related soft buffer size (according to DL HARQ process) from being reduced due to D2D communication.

<Embodiment 7>

In case of applying a CA (carrier aggregation) scheme, it may be able to configure the aforementioned embodiments 1 to 6 to be applied according to at least one of a rule #7-A and a rule #7-B described in the following.

In the following, for clarity, if the CA scheme is applied, it may assume that soft buffers are divided by such an equation as "size of the entire downlink soft buffers of a UE/(number of configured cells*(minimum value among maximum number of DL HARQ processes and 8))".

Specifically, when two cells are configured by the CA scheme, first of all, it may be able to allocate an area (i.e., 'S_TOTAL/2') corresponding to ½ of a size of the entire soft buffers (hereinafter, "S_TOTAL") to each cell and apply "S_TOTAL/2/(minimum number among the maximum number of DL HARQ processes and 8)" to each cell to determine a soft buffer size per DL HARQ process for each cell. And, it may be able to configure the rule #7-A and the rule #7-B described in the following to be restrictively applied only when at least one cell among N number of cells configured by the CA scheme has enabled D2D communication.

Rule #7-A: When N numbers of cells are configured by CA scheme and/or at least one cell has enabled D2D communication, the aforementioned embodiments 1 to 6 can be restrictively applied to a cell-related soft buffer area only in which the D2D communication is enabled.

In this case, when two cells (i.e., cell #A and cell #B) are configured by CA scheme and D2D communication is configured in the cell #A only in FDD system environment, it may be able to restrictively apply the embodiments 1 to 3 and the embodiment 2 mentioned earlier in the additional method related to the embodiments 1 to 3 to i) a soft buffer area related to the cell #A (i.e., 'S_TOTAL/2'), and/or ii) the embodiments 1 to 3 and the embodiment 2 mentioned earlier in the additional method related to the embodiments 1 to 3 may influence on a soft buffer size per DL HARQ process related to the cell #A (i.e., 'S_TOTAL/2') only, and/or iii) the embodiments 1 to 3 and the embodiment 2 mentioned earlier in the additional method related to the embodiments 1 to 3 may influence on a soft buffer size related to the cell #A only. In particular, the embodiments 1 to 3 and the embodiment 2 mentioned earlier in the additional method related to the embodiments 1 to 3 do not influence on a soft buffer size related to the cell #B to which D2D communication is not set (i.e., 'S_TOTAL/2') and/or a soft buffer size per DL HARQ process related to the cell #B (i.e., 'S_TOTAL/2/8').

Specifically, if two HARQ processes are additionally configured for D2D communication via the embodiment 2, a soft buffer size per DL HARQ process is changed to 'S_TOTAL/2/10' from 'S_TOTAL/2/8' in a soft buffer area related to the cell #A (i.e., 'S_TOTAL/2/8). On the contrary, a soft buffer size related to the cell #B to which D2D communication is not set and a soft buffer size per DL HARQ process are identically maintained by 'S_TOTAL/2' and 'S_TOTAL/2/8', respectively.

As a different example, if a change occurs on the soft buffer size relate to the cell #A by applying the embodiments 1 to 6 to the soft buffer size, it may be able to configure the soft buffer size related to the cell #B to be reconfigured (e.g., 'S_TOTAL—changed soft buffer size related to the cell #A') in consideration of the changed cell #A-related soft buffer size.

Rule #7-B: when N numbers of cells are configured by CA scheme and/or at least one cell configures D2D communication, the aforementioned embodiments 1 to 6 can be restrictively applied to a (allocated) soft buffer area related to a predefined or signaled specific cell.

In this case, the specific cell can be designated i) irrespective of whether or not D2D communication is set or ii) can be designated by a cell having a greatest cell index among cells to which D2D communication is set. By doing so, it may be able to prevent a soft buffer size related to a Pcell (i.e., 'cell index 0') and/or a soft buffer size per DL HARQ process from being influenced by a D2D communication configuration.

And, application of the rule #7-B can also be interpreted as a cell to which D2D communication is set borrows a partial soft buffer area of a different specific cell (e.g., a cell to which D2D communication is not set or a cell to which D2D communication is set) and manages the D2D communication.

As a further different example, the specific cell can be designated by a cell having a smallest cell index (irrespective of whether or not D2D communication is set or among cells to which D2D communication is set).

<Embodiment 8>

Table 3 shows an example for a method of efficiently managing a soft buffer to support both D2D communication and E2D communication (at the same time) mentioned earlier in the embodiments 1 to 6 and the additional method related to the embodiments.

In this case, such a term as "(downlink) HARQ process used for the usage of D2D communication" can also be interpreted as "sidelink process" mentioned in Table 4. The method mentioned in Table 3 can be applied in a manner that E2D communication and D2D communication share the entire soft buffers of a D2D UE or a soft buffer of a predefined or signaled specific area. In this case, the E2D communication may have priority higher than priority of the D2D communication. i) If the D2D UE does not store E2D communication-related soft bits in a soft buffer of the D2D UE or ii) if the D2D UE does not manage E2D communication-related (DL) HARQ process, it may indicate that it may be able to (re)use all of "MAXIMUM NUMBER OF TRANSPORT BLOCK BITS RECEIVED WITHIN A TTI" (refer to Table 4) according to UE-category information, which is reported by the D2D UE for E2D communication, for D2D communication.

Since the E2D communication has priority higher than priority of the D2D communication, if it is necessary to perform the E2D communication of the "MAXIMUM NUMBER OF TRANSPORT BLOCK BITS RECEIVED WITHIN A TTI", D2D communication-related soft bits stored in a soft buffer are dropped or discarded to support the E2D communication.

And, it may be able to configure the embodiment 8 to be restrictively applied to either D2D communication or D2D discovery only.

TABLE 3

It may be able to configure a downlink HARQ process used for D2D communication and a downlink HARQ process in legacy E2D direction to share a specific soft buffer area with each other based on a predefined priority rule. In this case, for example, it may be able to configure the downlink HARQ process in the E2D direction to preferentially use the specific soft buffer area prior to the downlink HARQ process used for the usage of D2D communication. In addition, if downlink communication load in E2D direction is not high at specific timing (or all downlink soft buffer areas of a UE are not occupied by downlink HARQ processes in E2D direction), it may be able to configure a specific downlink HARQ process used for the usage of D2D communication to operate using a predefined specific soft buffer area (or an unused soft buffer area). On the contrary, as the load of the downlink communication in E2D direction increases at specific timing, if it is necessary for downlink HARQ processes in E2D direction to use all downlink soft buffer areas of a UE, it may be able to configure a currently operating specific downlink HARQ process used for D2D communication to be omitted (or forcibly terminated). In particular, it may be able to configure a specific soft buffer area, which is occupied by the forcibly terminated downlink HARQ process used for D2D communication, to be used for the downlink HARQ processes in E2D direction again. In this case, as an additional example, the UE may assume that the specific downlink HARQ process used for D2D communication, which is omitted or forcibly shut down, successfully terminates communication all the time and it may be able to configure the UE to transmit ACK to a higher layer of the UE. On the contrary, the UE may assume that the specific downlink HARQ process used for D2D communication, which is omitted or forcibly shut down, fails in performing communication all the time and it may be able to configure the UE to transmit NACK to a higher layer of the UE. The proposed methods can be identically applied to a case that the downlink HARQ process used for the usage of D2D communication is configured to preferentially use the specific soft buffer area prior to the downlink HARQ process in E2D direction.

TABLE 4

Contiguous repetitions over subframes within the configured discovery resource pool is supported for D2D discovery. benefits of soft-combining of repeated transmissions of discovery messages within a discovery period when repeated transmissions are configured
In case the UE shares a common soft buffer for storing PDSCH and discovery message soft bits, if a UE's soft buffer cannot to accommodate soft channel bits for both PDSCH and discovery message receptions (note that soft buffer management is up to UE implementation) In such cases, PDSCH reception may be prioritized or discovery messages may not be combined (PDSCH reception shall not be impacted by D2D discovery reception) take the above into considering if/when defining performance tests for soft-combining of discovery messages within a discovery period
if the D2D discovery subframes in which repetitions occur are physically contiguous with the same starting and ending subframe for all discovery signals that the UE is to receive, this may help to limit UE complexity, although this depends on the configuration of the resource pools; Note that channel estimation combining is not assumed.
For D2D, use the term "maximum number of [Sidelink Processes]" instead of "maximum number of HARQ processes"
The maximum number of [Sidelink Processes] is the maximum number of sidelink transport blocks that a UE can handle at a given time instant. A transport block is assumed to have stopped being handled when it is sent to higher layers, or if the maximum number of retransmissions is reached and the UE discards the transport TABLE 4-continued block without sending it to higher layers. For D2D communication, from a receiving
D2D UE perspective,
The maximum number of Sidelink processes that a D2D UE is expected to handle
is 16 a single FFT per carrier can be used to receive these Sidelink processes (note
that this does not imply anything about whether the UE is expected to receive on more
than one carrier simultaneously) The maximum number of Sidelink transport block bits
received within a TTI is set to 25456 The maximum number of bits of a single Sidelink
transport block is 25456 SA and PD2DSCH are not included For D2D discovery, from a
receiving D2D UE perspective, .The maximum number of Sidelink processes that a D2D
UE is expected to handle is a UE capability which is one of 150, 4001 a single FFT per
carrier can be used to receive these Sidelink processes (note that this does not imply
anything about whether the UE is expected to receive on more than one carrier
simultaneously) The maximum number of transport block bits received within a TTI is
set to 50*232 The maximum number of bits of a single Sidelink transport block is 232 bits
there is no LBRM in D2D, and the performance requirements will be defined assuming
that the UE can store all the soft bits received associated with a given transport block.

The aforementioned embodiments/descriptions/rules of the present invention can be interpreted/applied/performed as an independent embodiment, respectively. Although the embodiments of the present invention can be independently implemented, the embodiments can also be implemented in a combined/aggregated form of a part of embodiments.

Moreover, the methods proposed by the present invention can be extensively applied to a case that D2D communication and E2D communication share all or a part of downlink soft buffer areas, a case of defining a new soft buffer for D2D communication, and a case of defining an uplink soft buffer similar to a legacy base station for a UE.

And, the methods proposed by the present invention can also be extensively applied to a case that D2D communication and E2D communication are performed under environment to which CA (carrier aggregation) scheme is applied.

And, the methods proposed by the present invention can also be extensively applied to a case that communication between UEs is performed at out of coverage of an eNB. For example, if the communication between UEs is performed at out of coverage of the eNB, it may be able to define a rule that a soft buffer related to D2D communication is managed based on information on the number of HARQ processes for the D2D communication, a HARQ process identifier (ID) for the D2D communication, a size of a soft buffer occupied by a HARQ process related to the D2D communication, and the like.

In particular, it can be interpreted as a soft buffer related to the D2D communication is managed based on predefined default configuration information at out of coverage of the eNB.

Additionally, the embodiments of the present invention can be configured to be restrictively applied according to a D2D service type (e.g., broadcast D2D, groupcast D2D, unicast D2D, etc.).

And, the embodiments of the present invention can be configured to be restrictively applied in specific D2D communication environment only (e.g., out-of-coverage environment, in-coverage D2D environment, partial-coverage D2D environment).

And, a base station can inform a UE of information on the aforementioned embodiments/description/rules/methods of the present invention or information on whether or not the embodiments/description/rules/methods are applied through a predefined signal (e.g., a physical layer or higher layer signal).

Moreover, the aforementioned embodiments can be configured to be restrictively applied only when D2D communication of a predetermined form (e.g., Mode 1 D2D communication, Mode 2 D2D communication, type 1 D2D discovery, type 2 D2D discovery) is performed.

Figure 18:
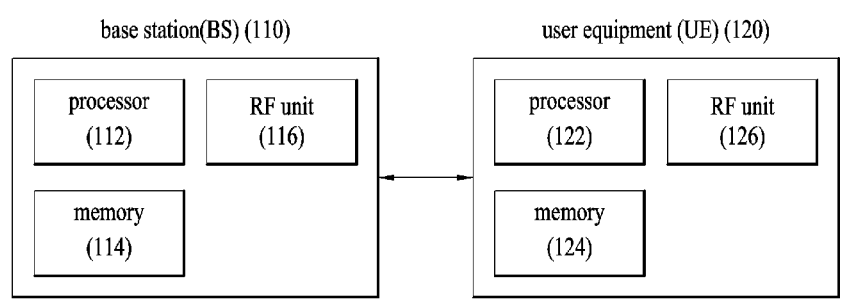
FIG. 18 is a diagram for a base station and a user equipment applicable to one embodiment of the present invention.

FIG. 18 is a diagram for a base station and a user equipment applicable to one embodiment of the present invention.

If a relay is included in a wireless communication system, communication is performed between a base station and the relay in backhaul link and communication is performed between the relay and a user equipment in access link. Hence, the base station and the user equipment shown in the drawing can be replaced with the relay in accordance with a situation.

Referring to FIG. 18, a wireless communication system includes a base station (BS) 110 and a user equipment (UE) 120. The BS 110 includes a processor 112, a memory 114 and a radio frequency (RF) unit 116. The processor 112 can be configured to implement the proposed functions, processes and/or methods. The memory 114 is connected with the processor 112 and then stores various kinds of information associated with an operation of the processor 112. The RF unit 116 is connected with the processor 112 and transmits and/or receives a radio signal. The user equipment 120 includes a processor 122, a memory 124 and a radio frequency (RF) unit 126. The processor 122 can be configured to implement the proposed functions, processes and/or methods. The memory 124 is connected with the processor 122 and then stores various kinds of information associated with an operation of the processor 122. The RF unit 126 is connected with the processor 122 and transmits and/or receives a radio signal. The base station 110 and/or the user equipment 120 may have a single antenna or multiple antennas.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by a base station may be performed by an upper node of the base station in some cases. In particular, in a network constructed with a plurality of network nodes including a base station, it is apparent that various operations performed for communication with a user equipment can be performed by a base station or other networks except the base station. 'Base station (BS)' may be substituted with such a terminology as a fixed station, a Node B, an eNode B (eNB), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor.

The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although the method of managing a buffer for D2D communication and WAN communication in a wireless communication system and an apparatus therefor are described centering on examples applied to 3GPP LTE system, it may be applicable to various wireless communication systems as well as to the 3GPP LTE system.

What is claimed is:

1. A method of managing a soft buffer, which is managed by a first user equipment (UE) for device-to-device (D2D) communication and eNode B-to-device (E2D) communication in a wireless communication system, the method comprising:
receiving, from a second UE, D2D communication data;
storing, by the first UE, the D2D communication data in a soft buffer of a specific downlink hybrid automatic repeat and request (HARQ) process; and
transmitting, to the second UE, an ACK/NACK signal corresponding to the D2D communication data;
wherein the specific downlink HARQ process is configured to support the D2D communication among a plurality of downlink HARQ processes configured for the E2D communication, and
wherein, when E2D data are previously stored in all of soft buffer areas associated with the plurality of downlink HARQ processes, the D2D communication data storing step discards E2D data previously stored in a soft buffer area of the specific downlink HARQ process and stores the D2D communication data,
wherein, when the E2D data does not exist in the soft buffer areas associated with the plurality of downlink HARQ processes, the first UE determines that transport block bits of maximum number received on a specific section are used for the D2D communication.

2. The method of claim 1, wherein the specific downlink HARQ process is configured to contain a downlink HARQ process ID lower than IDs of the remaining downlink HARQ processes except the specific downlink HARQ process among the plurality of downlink HARQ processes.

3. The method of claim 1, if the E2D data previously stored in the soft buffer area of the specific downlink HARQ process is discarded, further comprising the step of receiving redundancy version (RV) data of a predefined specific value again from an eNode B.

4. The method of claim 3, wherein the D2D communication corresponds to Mode 1 D2D communication.

5. The method of claim 1, wherein the D2D communication data storing step is performed only when the UE transmits and receives a D2D signal using a D2D resource pool.

6. The method of claim 5, wherein the D2D resource pool comprises a resource section which is defined according to a predefined offset value.

7. The method of claim 1, wherein a size of the soft buffer of the specific downlink HARQ process is determined according to the number of cells for which the D2D communication is set and the number of the plurality of downlink HARQ processes.

8. The method of claim 1, wherein the specific downlink HARQ process is a sidelink process.

9. A first user equipment (UE) managing a soft buffer for device-to-device (D2D) communication and eNode B-to-device (E2D) communication in a wireless communication system, the first UE comprising:
a radio frequency unit; and
a processor,
wherein the processor is configured to:
receive, from a second UE, D2D communication data,
store the D2D communication data in a soft buffer of a specific downlink hybrid automatic repeat and request (HARQ) process, and
transmit, to the second UE, an ACK/NACK signal corresponding to the D2D communication data,
wherein the specific downlink HARQ process is configured to support the D2D communication among a plurality of downlink HARQ processes configured for the E2D communication, and
wherein, when E2D data are previously stored in all of soft buffer areas associated with the plurality of downlink HARQ processes, E2D data previously stored in a soft buffer area of the specific downlink HARQ process is discarded and the D2D communication data is stored,
wherein, when the E2D data does not exist in the soft buffer areas associated with the plurality of downlink HARQ processes, the first UE determines that transport block bits of maximum number received on a specific section are used for the D2D communication.

* * * * *